(12) United States Patent
Kim et al.

(10) Patent No.: US 10,619,080 B2
(45) Date of Patent: Apr. 14, 2020

(54) ADHESIVE COMPOSITION FOR OPTICAL USE AND OPTICAL DEVICE

(71) Applicant: LG Chem, Ltd., Seoul (KR)

(72) Inventors: Jang Soon Kim, Daejeon (KR); Kyung Jun Yoon, Daejeon (KR); Hong Beom Yoon, Daejeon (KR); Min Kyeong Pyo, Daejeon (KR); Jin Young Huh, Daejeon (KR)

(73) Assignee: LG Chem, Ltd. (KR)

( * ) Notice: Subject to any disclaimer, the term of this patent is extended or adjusted under 35 U.S.C. 154(b) by 116 days.

(21) Appl. No.: 15/563,260

(22) PCT Filed: Nov. 23, 2016

(86) PCT No.: PCT/KR2016/013555
§ 371 (c)(1),
(2) Date: Sep. 29, 2017

(87) PCT Pub. No.: WO2017/090982
PCT Pub. Date: Jun. 1, 2017

(65) Prior Publication Data
US 2018/0094172 A1    Apr. 5, 2018

(30) Foreign Application Priority Data

Nov. 23, 2015 (KR) .................. 10-2015-0164175

(51) Int. Cl.
| | |
|---|---|
| *C09J 133/08* | (2006.01) |
| *C09J 4/00* | (2006.01) |
| *C09J 133/14* | (2006.01) |
| *C08G 18/08* | (2006.01) |
| *C09J 4/06* | (2006.01) |
| *C08F 299/04* | (2006.01) |
| *C09J 11/06* | (2006.01) |
| *C09J 7/30* | (2018.01) |
| *C09J 175/16* | (2006.01) |

(52) U.S. Cl.
CPC ....... *C09J 133/08* (2013.01); *C08F 299/0492* (2013.01); *C08G 18/0885* (2013.01); *C09J 4/00* (2013.01); *C09J 4/06* (2013.01); *C09J 7/30* (2018.01); *C09J 11/06* (2013.01); *C09J 133/14* (2013.01); *C09J 175/16* (2013.01); *Y10T 428/10* (2015.01); *Y10T 428/1045* (2015.01); *Y10T 428/1077* (2015.01)

(58) Field of Classification Search
CPC ..... C09J 133/08; C09J 7/30; C09J 7/38; C09J 4/00; C09J 11/06; C09J 175/14; C09J 175/16; C08G 18/0885; G02F 1/1333; G02F 1/133308; G02F 2001/133311; Y10T 428/10; Y10T 428/1045; Y10T 428/1077
USPC ....... 428/1.1, 1.5, 1.54; 156/275.5; 522/184; 526/329.7; 524/195
See application file for complete search history.

(56) References Cited

U.S. PATENT DOCUMENTS

| | | | |
|---|---|---|---|
| 2008/0160300 A1 | 7/2008 | Hwang et al. | |
| 2009/0065140 A1* | 3/2009 | Osoegawa | C08F 290/06 156/275.5 |
| 2011/0315223 A1 | 12/2011 | Ting et al. | |
| 2012/0177912 A1* | 7/2012 | Kim | C09J 175/16 428/332 |
| 2018/0094172 A1 | 4/2018 | Kim et al. | |

FOREIGN PATENT DOCUMENTS

| | | |
|---|---|---|
| CN | 101215730 A | 7/2008 |
| CN | 101230177 A | 7/2008 |
| CN | 103038286 A | 4/2013 |
| CN | 103571425 A | 2/2014 |
| KR | 100815383 B1 | 3/2008 |
| KR | 20080054588 A | 6/2008 |
| KR | 20130121074 A | 11/2013 |
| TW | 201229178 A | 7/2012 |
| WO | 2017090982 A1 | 6/2017 |

OTHER PUBLICATIONS

Search report from International Application No. PCT/KR2016/013555, dated Feb. 24, 2017.
Chinese Search Report for Application No. CN 201680017176.5 dated Nov. 18, 2019.

* cited by examiner

*Primary Examiner* — Ruiyun Zhang
(74) *Attorney, Agent, or Firm* — Lerner, David, Littenberg, Krumholz & Mentlik, LLP

(57) ABSTRACT

The present invention provides an adhesive composition for optical use, including a polyester-based urethane acrylate oligomer, an acrylate-based monomer, a photoinitiator, and a Anti-hydrolysis agent, and an optical device equipped with an adhesive layer including photocured products of the adhesive composition for optical use.

11 Claims, No Drawings

ADHESIVE COMPOSITION FOR OPTICAL USE AND OPTICAL DEVICE

CROSS-REFERENCE TO RELATED APPLICATIONS

The present application is a national phase entry under 35 U.S.C. § 371 of International Application No. PCT/KR2016/013555 filed Nov. 23, 2016, which claims priority from Korean Patent Application No. 10-2015-0164175 filed in the Korean Intellectual Property Office on Nov. 23, 2015, the entire contents of which are incorporated herein by reference.

The present invention relates to an adhesive composition for optical use and an optical device.

BACKGROUND ART

The smart mobile era has opened as smartphones and tablet PCs have become recently more prevalent. While the existing mobile phones were specialized in communication functions, today's smart mobile devices have been developed to have high-performance display functions. As described above, as display functions of mobile devices have been important, input devices and touch functions are complementarily being developed, and obtaining a large area of a display is also becoming an important element.

Touch panels are introduced into smart mobile devices having a large area, and a UV curable transparent adhesive used in this case requires excellent optical characteristics associated with transparency, visibility, and the like together with high adhesive strength. Furthermore, maintaining excellent physical properties of the adhesive under high temperature and high humidity environments for a long period of time is one of the important tasks in imparting excellent durability to mobile devices to which the adhesive is applied, and the like.

DETAILED DESCRIPTION OF THE INVENTION

Technical Problem

An exemplary embodiment of the present invention provides an adhesive composition for optical use, which has high adhesive strength and excellent optical characteristics, and maintains the adhesive strength and optical characteristics even under high temperature and high temperature environments for a long period of time, and thus may impart excellent durability to an optical device to which the adhesive composition for optical use is applied.

Another exemplary embodiment of the present invention is an optical device equipped with an adhesive layer formed by using the adhesive composition for optical use, the adhesive layer may maintain excellent adhesive strength while not being discolored at normal temperature and even under high temperature and high humidity environments for a long period of time, and as a result, the optical device may exhibit improved durability.

Technical Solution

An exemplary embodiment of the present invention provides an adhesive composition for optical use, including a polyester-based urethane acrylate oligomer, an acrylate-based monomer, a photoinitiator, and a Anti-hydrolysis agent.

Another exemplary embodiment of the present invention provides an optical device equipped with an adhesive layer including photocured products of the adhesive composition for optical use.

Advantageous Effects

The adhesive composition for optical use has high adhesive strength and excellent optical characteristics, and maintains the adhesive strength and optical characteristics even under high temperature and high temperature environments for a long period of time, and thus may impart excellent durability to an optical device to which the adhesive composition for optical use is applied.

The optical device is equipped with an adhesive layer including photocured products of the adhesive composition for optical use, and since the adhesive layer maintains excellent adhesive strength while not being discolored even under high temperature and high humidity environments for a long period of time, the optical device may have improved durability.

MODE FOR INVENTION

The benefits and features of the present invention, and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims.

An exemplary embodiment of the present invention provides an adhesive composition for optical use, including a polyester-based urethane acrylate oligomer, an acrylate-based monomer, a photoinitiator, and a Anti-hydrolysis agent.

The adhesive composition for optical use may use the polyester-based urethane acrylate oligomer, an acrylate-based monomer, and a photoinitiator to secure physical properties such as high adhesive strength and excellent optical characteristics, and furthermore, may contribute to the maximization of an advantage in that the adhesive strength and optical characteristics are maintained under high temperature and high humidity environments for a long period of time.

The polyester-based urethane acrylate oligomer exhibits excellent physical properties in terms of adhesive strength, but has a disadvantage in that the chemical structure of polyester is vulnerable to hydrolysis under high temperature and high humidity environments. The adhesive composition for optical use includes a Anti-hydrolysis agent together with the polyester-based urethane acrylate oligomer, and thus, may prevent the polyester structure from being hydrolyzed under high temperature and high humidity environments, and may obtain an advantage in that the adhesive strength and optical characteristics are maintained under high temperature and high humidity environments for a long period of time.

According to an exemplary embodiment of the present invention, the Anti-hydrolysis agent may have a melting point (Tm) of 0° C. or more and 40° C. or less. Specifically, the Anti-hydrolysis agent may have a melting point (Tm) of 0° C. or more and 10° C. or less, more specifically, 5° C. or more and 10° C. or less, or 5° C. When the melting point of the Anti-hydrolysis agent satisfies the aforementioned range, the Anti-hydrolysis agent may be mixed well with the adhesive composition for optical use, which has a predetermined viscosity, and the compatibility with polyester-based urethane acrylate oligomer may be maximized.

According to an exemplary embodiment of the present invention, the Anti-hydrolysis agent may be a liquid. Specifically, the Anti-hydrolysis agent may be a compound in a liquid form, and more specifically, the Anti-hydrolysis agent may be a liquid at a normal temperature of about 20° C. to about 30° C. Furthermore, the Anti-hydrolysis agent may be a solid at normal temperature, and is changed into a liquid form by a small amount of heat generated when the solid Anti-hydrolysis agent is mixed with an adhesive composition for optical use, and thus may be mixed with other materials. That is, the Anti-hydrolysis agent has a melting point of 0° C. or more and 40° C. or less, and the Anti-hydrolysis agent may be mixed in a liquid form without an additional heating process.

The Anti-hydrolysis agent has a melting point of 0° C. or more and 40° C. or less, and may be mixed without adding a separate heating process when the adhesive composition for optical use is prepared. When the Anti-hydrolysis agent has a melting point within the aforementioned range, it is possible to improve the compatibility with the polyester-based urethane acrylate oligomer, and a heating process is not necessary when an adhesive composition is prepared, so that it is possible to prevent physical properties of a low molecular weight monomer accompanied by a heating process from being changed, and performance of preventing the hydrolysis may be exhibited without degrading performance of the Anti-hydrolysis agent.

According to an exemplary embodiment of the present invention, the Anti-hydrolysis agent may include one selected from the group consisting of a carbodiimide-based compound, an isocyanate-based compound, a polyfunctional hydroxy group-containing compound, a polyfunctional carboxyl group-containing compound, a polyfunctional amine-based compound, and a combination thereof.

The adhesive composition for optical use may improve performance of preventing the discoloration of an adhesive layer, which is prepared by using the adhesive composition for optical use, by using a Anti-hydrolysis agent which is a liquid form and includes any one of the above-described compounds, and may secure all the advantages in that it is possible to maintain the adhesion properties at an excellent level under high temperature and high humidity environments, and to effectively prevent a liquid crystal from being damaged against external impact.

According to an exemplary embodiment of the present invention, the adhesive composition for optical use includes a polyester-based urethane acrylate oligomer. The polyester-based urethane acrylate oligomer is an oligomer having both a polyester chemical structure and a urethane chemical structure, and may be prepared, for example, by reacting a polyester polyol with an isocyanate compound having an acrylate group. Through the oligomer having both the polyester structure and the urethane structure as described above, the adhesive composition for optical use may exhibit excellent adhesive strength as compared to oligomers which do not have both a polyester chemical structure and a urethane chemical structure.

According to an exemplary embodiment of the present invention, the polyester-based urethane acrylate oligomer may include a mixture of a monofunctional polyester-based urethane acrylate oligomer and a polyfunctional polyester-based urethane acrylate oligomer. The 'monofunctional' means including one acrylate functional group having photo reactivity, and the 'polyfunctional' means including two or more acrylate functional groups having photo reactivity.

When the polyester-based urethane acrylate oligomer includes both a monofunctional polyester-based urethane acrylate oligomer and a polyfunctional polyester-based urethane acrylate oligomer, it is possible to improve the adhesive strength of an adhesive layer to be prepared and secure hardness and modulus at appropriate levels, and to obtain an advantage in that it is advantageous to apply the polyester-based urethane acrylate oligomer to a final product.

Specifically, according to an exemplary embodiment of the present invention, the polyester-based urethane acrylate oligomer may include a mixture of a monofunctional polyester-based urethane acrylate oligomer and a bifunctional polyester-based urethane acrylate oligomer.

More specifically, according to an exemplary embodiment of the present invention, the polyester-based urethane acrylate oligomer includes a mixture of a monofunctional polyester-based urethane acrylate oligomer and a polyfunctional polyester-based urethane acrylate oligomer, and the weight ratio of the monofunctional polyester-based urethane acrylate oligomer and the polyfunctional polyester-based urethane acrylate oligomer may be 4:1 to 7:1.

When the monofunctional and polyfunctional polyester-based urethane acrylate oligomers are mixed and used at a weight ratio within the above-described range, an effect of improving adhesive strength and an effect of improving reliability under high temperature and high humidity environments may be maximized, and the polyester-based urethane acrylate oligomer is applied to an optical device, so that it is possible to implement excellent durability. Furthermore, when the monofunctional and polyfunctional polyester-based urethane acrylate oligomers are mixed and used at a weight ratio within the above-described range, the hardness of an adhesive layer to be prepared is not extremely high or low, and thus may be adjusted to a hardness appropriate for being applied to electronic products.

According to an exemplary embodiment of the present invention, the polyester-based urethane acrylate oligomer may have a weight average molecular weight (Mw) of 10,000 or more and 40,000 or less. When the weight average molecular weight of the polyester-based urethane acrylate oligomer satisfies the aforementioned range, it is possible to obtain an advantage in that high adhesive strength and viscosity with good processability are exhibited.

According to an exemplary embodiment of the present invention, the monofunctional polyester-based urethane acrylate oligomer may have a weight average molecular weight (Mw) of 10,000 or more and 25,000 or less, and the polyfunctional polyester-based urethane acrylate oligomer may have a weight average molecular weight (Mw) of 30,000 or more and 40,000 or less. When the polyester-based urethane acrylate oligomer uses a mixture of the monofunctional polyester-based urethane acrylate oligomer and the polyfunctional polyester-based urethane acrylate oligomer, which have a weight average molecular weight within the aforementioned ranges, the adhesive composition for optical use may be prepared into an adhesive layer of which the hardness and shear strength are adjusted to be appropriate for being applied to electronic products.

According to an exemplary embodiment of the present invention, the adhesive composition for optical use includes an acrylate-based monomer together with the polyester-based urethane acrylate oligomer. The acrylate-based monomer is a reactive diluted monomer, and specifically, imparts adhesive properties and serves to secure reliability under high temperature and high humidity environments and simultaneously adjust the viscosity.

According to an exemplary embodiment of the present invention, the acrylate-based monomer may include: a monomer having a cycloalkyl group having 3 to 15 carbon atoms; a monomer having a heterocycloalkyl group having 2 to 15 carbon atoms; and a monomer having a hydrophilic functional group.

Specifically, according to an exemplary embodiment of the present invention, the monomer having a cycloalkyl group having 3 to 15 carbon atoms may include one selected from the group consisting of isobornyl acrylate (IBOA), isobornyl methacrylate (IBOMA), cyclohexyl acrylate, cyclohexyl methacrylate, dicyclopentadiene acrylate, dicyclopentadiene methacrylate, and a combination thereof.

Further, according to an exemplary embodiment of the present invention, the monomer having a heterocycloalkyl group having 2 to 15 carbon atoms may include one selected from the group consisting of tetrahydroperfuryl acrylate (THFA), tetrahydroperfuryl methacrylate (THFMA), and a combination thereof.

In addition, according to an exemplary embodiment of the present invention, the monomer having a hydrophilic functional group may be a monomer having a hydroxy group, a carboxyl group, or an amine group.

Specifically, the monomer having a hydroxy group may include one selected from the group consisting of hydroxyethylacrylate, hydroxyethylmethacrylate, hydroxypropylacrylate, hydroxypropylmethacrylate, hydroxybutylacrylate, hydroxybutylmethacrylate, hydroxypentylacrylate, hydroxypentylmethacrylate, hydroxyhexylacrylate, hydroxyhyexylmethacrylate, hydroxyoctylacrylate, hydroxyoctylmethacrylate, hydroxydecylacrylate, hydroxydecylmethacrylate, and a combination thereof.

In addition, the monomer having a carboxyl group may include one selected from the group consisting of acrylic acid, methacrylic acid, crotonic acid, itaconic acid, fumaric acid, cinnamonic acid, Michael adducts of (meth)acrylic acid, and a combination thereof, and the Michael adduct of (meth)acrylic acid may include one selected from the group consisting of an acrylic acid dimer, a methacrylic acid dimer, an acrylic acid trimer, a methacrylic acid trimer, an acrylic acid tetramer, a methacrylic acid tetramer, and a combination thereof.

Furthermore, the monomer having an amine group may include one selected from the group consisting of dimethylaminoethyl (meth)acrylate, diethylaminoethyl (meth)acrylate, and a combination thereof.

The acrylate-based monomer may further include one selected from the group consisting of methyl (meth)acrylate, ethyl (meth)acrylate, n-propyl (meth)acrylate, isopropyl (meth)acrylate, n-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and a combination thereof.

According to an exemplary embodiment of the present invention, the adhesive composition for optical use has photocurability, and includes a photoinitiator for photocuring. The photoinitiator may be used without particular limitation as long as the photoinitiator initiates photocuring by light irradiation, but may include, for example, one selected from the group consisting of benzoin methyl ether, 2,4,6-trimethylbenzoyl diphenylphosphine oxide, bis(2,4,6-trimethylbenzoyl) phenylphosphine oxide, α,α-methoxy-α-hydroxyacetophenone, 2-benzoyl-2-(dimethylamino)-1-[4-(4-morpholinyl) phenyl]-1-butanone, 2,2-dimethoxy-2-phenylacetophenone, 2,2-dimethoxy-1,2-diphenylethan-1-one, 1-hydroxy-cyclohexyl-phenyl ketone, 2-benzyl-2-(dimethylamino)-1-[4-(4-morpholinyl)phenyl]-1-butanone, and a combination thereof.

The adhesive composition for optical use includes both the polyester-based urethane acrylate oligomer and the Anti-hydrolysis agent, and thus may secure both high adhesive strength and excellent durability under high temperature and high humidity environments.

However, a Anti-hydrolysis agent generally used may have a color as it is, or may be in a semi-transparent or opaque state, and the Anti-hydrolysis agent may not be appropriate for being used in an adhesive requiring excellent optical characteristics.

In this regard, in an exemplary embodiment of the present invention, the adhesive composition for optical use itself has a color by appropriately adjusting the content of each component, or may implement excellent optical characteristics without degrading transparency and visibility even though a semi-transparent or opaque Anti-hydrolysis agent is used.

According to an exemplary embodiment of the present invention, the content of the Anti-hydrolysis agent may be 0.1 parts by weight or more and 10 parts by weight or less based on 100 parts by weight of the polyester-based urethane acrylate oligomer. Specifically, the content of the Anti-hydrolysis agent may be 0.5 parts by weight or more and 5 parts by weight or less, or 0.5 parts by weight or more and 2 parts by weight or less, based on 100 parts by weight of the polyester-based urethane acrylate oligomer. When the Anti-hydrolysis agent is used at a content within the aforementioned range, it is possible to obtain an advantage in that performance of maintaining adhesive strength under high temperature and high humidity environments may be excellently maintained within the range degrading optical characteristics.

According to an exemplary embodiment of the present invention, the content of the acrylate-based monomer may be 10 parts by weight or more and 25 parts by weight or less based on 100 parts by weight of the polyester-based urethane acrylate oligomer. Specifically, the content of the acrylate-based monomer may be 12 parts by weight or more and 20 parts by weight or less, or 15 parts by weight or more and 20 parts by weight or less, based on 100 parts by weight of the polyester-based urethane acrylate oligomer. When the acrylate-based monomer is used at a content within the range, the adhesive composition for optical use may secure high step absorbency, and may exhibit high adhesive strength after photocuring.

According to an exemplary embodiment of the present invention, the content of the photoinitiator may be 0.1 parts by weight or more and 2 parts by weight or less based on 100 parts by weight of the polyester-based urethane acrylate oligomer. Specifically, the content of the photoinitiator may be 0.5 parts by weight or more and 1.5 parts by weight or less based on 100 parts by weight of the polyester-based urethane acrylate oligomer. When the photoinitiator is used at a content within the range, the adhesive composition for optical use may secure a gel content required for photocuring, and may implement adhesive strength at a required level.

According to an exemplary embodiment of the present invention, the adhesive composition for optical use may further include one selected from the group consisting of a thixotropic agent, a plasticizer, an antioxidant, a light stabilizer, a curing agent, a curing accelerator, a tackifier, a surface lubricant, a leveling agent, a softener, an anti-aging agent, an ultraviolet absorber, a polymerization inhibitor, and a combination thereof.

The thixotropic agent may serve to impart a thixotropic property to the adhesive composition for optical use. The 'thixotropic property' refers to a property in which a suspension does not have fluidity in a static state, but has fluidity when being vibrated. The adhesive composition for optical use may further include a thixotropic agent, and thus may obtain a process advantage when applied to a required position.

Specifically, the thixotropic agent may include one selected from the group consisting of fumed silica, bentonite, precipitated calcium carbonate ultrafine, and a combination thereof. For example, the adhesive composition for optical use may include fumed silica as a thixotropic agent, and in this case, it may be advantageous to secure a thixotropic property without degrading optical characteristics.

When the adhesive composition for optical use includes a thixotropic agent, the content of the thixotropic agent may be 1 part by weight or more and 3.5 parts by weight or less based on 100 parts by weight of the polyester-based urethane acrylate oligomer.

The plasticizer is contained in the adhesive composition for optical use, and thus may serve to adjust the viscosity and impart flexibility to a cured adhesive composition for optical use.

Specifically, the plasticizer may include one selected from the group consisting of diisononyl cyclohexane-1,2-dicarboxylate (DINCH), bis-2-ethylhexylhexane dioate (DEHA), dioctyl adipate (DOA), diisononyl adipate (DINA), triethylene glycol bis-2-detylhexanoate (TEG-EH), and a combination thereof.

When the adhesive composition for optical use includes a plasticizer, the content of the plasticizer may be 10 part by weight or more and 30 parts by weight or less based on 100 parts by weight of the polyester-based urethane acrylate oligomer. Within the content range, the plasticizer may adjust the viscosity of the adhesive composition for optical use and improve the optical characteristics thereof, and the plasticizer is a non-functional group series and does not participate in the reaction, and thus may obtain an effect of suppressing an increase in the curing shrinkage.

The curing agent may serve to adjust the curing degree when the adhesive composition for optical use is cured.

The curing agent may include, for example, a bifunctional acrylate compound, and the bifunctional acrylate compound may include one selected from the group consisting of hexanediol diacrylate (HDDA), polyethylene glycol diacrylate (PEGDA), butanediol diacrylate (BDDA), tripropylene glycol diacrylate (TPGDA), and a combination thereof.

When the adhesive composition for optical use further includes a curing agent, the content of the curing agent may be 0.1 parts by weight or more and 2 parts by weight or less based on 100 parts by weight of the polyester-based urethane acrylate oligomer. Within the content range of the curing agent, the curing agent may obtain an effect of increasing the curing density of the adhesive composition for optical use to increase the high temperature reliability and improving the cohesive strength.

Another exemplary embodiment of the present invention provides an optical device equipped with an adhesive layer including photocured products of the adhesive composition for optical use.

The matters on the adhesive composition for optical use are as described above. The optical device may exhibit excellent durability through an adhesive layer including the photocured products of the adhesive composition for optical use, and optical characteristics may also be excellent.

The adhesive composition for optical use may be applied in a liquid state to an optical device. When the adhesive composition for optical use is applied in a liquid state to an optical device, the adhesive composition for optical use may be applied to a site where there are structurally more steps, thereby exhibiting excellent step absorbency, as compared to the case where the adhesive composition for optical use is applied in the form of a cured or semi-cured film to an optical device. Further, even though the adhesive composition for optical use is applied among hard substrates, it is possible to obtain an advantage favorable to the adhesion of a large area.

The adhesive composition for optical use is applied in a liquid state to an optical device, and is photocured after being applied to the optical device. Therefore, the optical device is equipped with an adhesive layer including photocured products of the adhesive composition for optical use. In this case, the adhesive composition for optical use is photocured by irradiating a light having a wavelength of about 280 nm to about 420 nm thereon, and for example, the photocured products may be formed by irradiating photo energy of about 1,000 mJ/cm$^2$ to about 6,000 mJ/cm$^2$. When the adhesive composition for optical use is photocured by a light within the aforementioned wavelength and energy ranges, excellent durability may be implemented, and it is possible to obtain a curing rate which is faster than the curing rate for thermal curing.

According to an exemplary embodiment of the present invention, the adhesive layer may have a Shore hardness of 9 or more and 12 or less, and specifically, the Shore E hardness may satisfy the aforementioned range. When the hardness of the adhesive layer is less than the aforementioned range, there is a problem in that a level at which the adhesive strength is required fails to be satisfied, and when the hardness of the adhesive layer is more than the aforementioned range, there is a problem in that a yellowing phenomenon occurs due to external impact or stress generated by processes. The Shore E hardness can be measured by a typical method, and may be measured at a normal temperature, for example, by using a Shore E hardness meter for an adhesive layer in the form of a cured cylinder with a diameter of 20 mm and a height of 6 mm.

The optical device may be a liquid crystal display equipped with a touch panel. The adhesive composition for optical use has excellent optical characteristics in terms of considering transparency, haze, and the like, and may be applied to a position where the interface attachment is required without degrading the visibility, thereby exhibiting excellent performance.

According to an exemplary embodiment of the present invention, the adhesive layer may have a light transmittance of 90% or more, specifically, 95% or more and 99% or less. The light transmittance may be a light transmittance measured in a visible light wavelength range, and may be a light transmittance measured from a light with a wavelength of 550 nm. In addition, the adhesive layer may have a haze of 1.0% or less, specifically, 0.5% or less. When the light transmittance and the haze of the adhesive layer satisfy the aforementioned range, respectively, the optical device may exhibit excellent visibility.

Hereinafter, specific examples of the present invention will be suggested. However, the Examples described below are only provided for specifically exemplifying or explaining an exemplary embodiment of the present invention, and the present invention is not limited thereby.

Example 1

A mixture of polyester-based urethane acrylate oligomers was prepared by mixing a monofunctional polyester-based urethane acrylate oligomer having a weight average molecular weight of 10,000 to 20,000 with a bifunctional polyester-based urethane acrylate oligomer having a weight average molecular weight of 30,000 to 40,000 at a weight ratio of 4:1. Based on 100 parts by weight of the polyester-based urethane acrylate oligomer, 15 parts by weight of acrylate and 4 parts by weight of hydroxy (meth)acrylate as reaction diluted monomers were mixed with the mixture. And then, based on 100 parts by weight of the polyester-based urethane acrylate oligomer, 1 part by weight of a photoinitiator, 25 parts by weight of a plasticizer, and 3 parts by weight of fumed silica were mixed, and 1 part by weight of a liquid carboimide-based Anti-hydrolysis agent having a melting point (Tm) of 5° C. was mixed with the resulting mixture without a separate heating process, thereby preparing an adhesive composition for optical use.

Example 2

An adhesive composition for optical use was prepared in the same manner as in Example 1, except that 1 part by weight of a bifunctional acrylate was further included as a curing agent in 100 parts by weight of the polyester-based urethane acrylate oligomer.

Example 3

An adhesive composition for optical use was prepared in the same manner as in Example 1, except that a mixture of polyester-based urethane acrylate oligomers was prepared by mixing a monofunctional polyester-based urethane acrylate oligomer having a weight average molecular weight of 10,000 to 20,000 with a bifunctional polyester-based urethane acrylate oligomer having a weight average molecular weight of 30,000 to 40,000 at a weight ratio of 7:1.

Example 4

An adhesive composition for optical use was prepared in the same manner as in Example 1, except that a mixture of polyester-based urethane acrylate oligomers was prepared by mixing a monofunctional polyester-based urethane acrylate oligomer having a weight average molecular weight of 10,000 to 20,000 with a bifunctional polyester-based urethane acrylate oligomer having a weight average molecular weight of 30,000 to 40,000 at a weight ratio of 5:1.

Comparative Example 1

An adhesive composition for optical use was prepared in the same manner as in Example 1, except that the liquid carboimide-based Anti-hydrolysis agent having a melting point (Tm) of 5° C. was not included at all.

Comparative Example 2

An adhesive composition for optical use was prepared in the same manner as in Example 2, except that the liquid carboimide-based Anti-hydrolysis agent having a melting point (Tm) of 5° C. was not included at all.

Comparative Examples 3 and 4

An adhesive composition for optical use was prepared in the same manner as in Example 1, except that liquid carboimide-based preventing agents having a melting point (Tm) of 50° C. and 80° C. were used, respectively, but it was not possible to prepare the adhesive composition into the adhesive layer because there occurred a problem in that the Anti-hydrolysis agent was not mixed with other components without a heating process.

Reference Example 1

An adhesive composition for optical use was prepared in the same manner as in Example 1, except that a mixture of polyester-based urethane acrylate oligomers was prepared by mixing a monofunctional polyester-based urethane acrylate oligomer having a weight average molecular weight of 10,000 to 20,000 with a bifunctional polyester-based urethane acrylate oligomer having a weight average molecular weight of 30,000 to 40,000 at a weight ratio of 3:1.

Reference Example 2

An adhesive composition for optical use was prepared in the same manner as in Example 1, except that a mixture of polyester-based urethane acrylate oligomers was prepared by mixing a monofunctional polyester-based urethane acrylate oligomer having a weight average molecular weight of 10,000 to 20,000 with a bifunctional polyester-based urethane acrylate oligomer having a weight average molecular weight of 30,000 to 40,000 at a weight ratio of 8:1.

Reference Example 3

An adhesive composition for optical use was prepared in the same manner as in Example 1, except that a mixture of polyester-based urethane acrylate oligomers was prepared by mixing a polyester-based urethane acrylate oligomer having a weight average molecular weight of 10,000 to 20,000, a bifunctional polyester-based urethane acrylate oligomer having a weight average molecular weight of 30,000 to 40,000, and a bifunctional polyester-based urethane acrylate oligomer having a weight average molecular weight of 15,000 at a weight ratio of 18:5:1 (a weight ratio of the monofunctional polyester-based urethane acrylate oligomer and the bifunctional polyester-based urethane acrylate oligomers=3:1).

Experimental Example 1: Measurement of Shore Hardness and Evaluation of Reliability Thereof Each of the adhesive compositions for optical use according to Examples 1 to 4, Comparative Examples 1 and 2, and Reference Examples 1 to 3 was photocured under a photo energy condition of 3,000 mJ/cm² by using a light source (metal halide) to prepare an adhesive layer, and the initial Shore E hardness was measured by using a Shore E hardness meter (Asker, CL-150) at a normal temperature. Subsequently, the adhesive layer was left to stand under a temperature of 60° C. and a relative humidity of 90% for 5 days, and then the post-Shore E hardness (60/90 5 days) was measured by the same method. The results are shown in the following Table 1.

Experimental Example 2: Measurement of Shear Strength and Evaluation of Reliability Thereof Each of the adhesive compositions for optical use according to Examples 1 to 4, Comparative Examples 1 and 2, and Reference Examples 1 to 3 was applied to have a diameter of 2 cm and a thickness of 200 μm between two slide glasses to obtain an adhesive, and the adhesive was photocured under a photo energy condition of 3,000 mJ/cm² by using a light source (metal halide) to prepare an adhesive layer, thereby making a sample for measuring the shear strength. Furthermore, the initial shear strength was measured at 25° C. at a rate of 25 mm/min by using an adhesive strength measuring apparatus (Stable Micro Systems, TA XT-PLUS). Subsequently, the adhesive layer was left to stand under a temperature of 85° C. and a relative humidity of 85% for 3 days, and then the post-Shore E strength (85/85 3 days) was measured by the same method. The results are shown in the following Table 1.

For the hardness and the shear strength measured in Experimental Examples 1 and 2, each of the rates in decrease was calculated by the following Equation 1.

Rate in decrease (%)=(Initial value−Post value)/Initial value×100     [Equation 1]

TABLE 1

| | Shore E hardness | | | Shear strength [MPa] | | |
|---|---|---|---|---|---|---|
| | Initial | 60/90 5 days | Rate in decrease | Initial | 85/85 3 days | Rate in decrease |
| Example 1 | 10.7 | 10.5 | 1.87% | 0.98 | 0.95 | 3.06% |
| Example 2 | 11.9 | 11.9 | 0% | 0.79 | 0.77 | 2.53% |
| Example 3 | 10.6 | 10.3 | 2.83% | 0.73 | 0.68 | 6.85% |
| Example 4 | 9.2 | 9.0 | 2.17% | 0.5 | 0.46 | 8.00% |
| Comparative Example 1 | 11.7 | 9.9 | 15.38% | 1.23 | 0.36 | 70.73% |
| Comparative Example 2 | 11.5 | 11.0 | 4.35% | 1.14 | 0.54 | 52.63% |
| Reference Example 1 | 13.0 | 12.9 | 0.77% | 1.13 | 1.07 | 5.31% |
| Reference Example 2 | 7.4 | 7.2 | 2.70% | 0.23 | 0.19 | 17.39% |
| Reference Example 3 | 14.0 | 14.0 | 0% | 1.23 | 1.2 | 2.44% |

Referring to the data in Table 1, it can be seen that the adhesive layers prepared by using the adhesive compositions for optical use according to the Examples have excellent effects of securing the durability of physical properties under high temperature and high humidity environments as compared to the adhesive compositions for optical use in Comparative Examples 1 and 2.

Specifically, the adhesive compositions for optical use in Examples 1 and 2 have a rate in decrease of less than 4% in hardness and shear strength, under high temperature and high humidity environments, and exhibit a significantly lower degree of decrease than in Comparative Examples 1 and 2, and from the results, it can be confirmed that physical properties such as hardness and shear strength are maintained well under high temperature and high humidity environments.

In addition, referring to the results of Comparative Examples 1 and 2, it can be seen that a curing agent is insufficient to complement the disadvantages of the polyester-based urethane acrylate oligomer vulnerable to hydrolysis, and referring to the results of Examples 1 and 2, it can be seen that when a Anti-hydrolysis agent and a curing agent are together used, the reliability is excellent under high temperature and high humidity environments.

Furthermore, when the results of Reference Examples 1 and 2 and the Examples are compared with each other, in the case where the weight ratio of the monofunctional polyester-based urethane acrylate oligomer and the bifunctional polyester-based urethane acrylate oligomer is 4:1 to 7:1, a hardness at the most appropriate level may be exhibited when the adhesive composition for optical use is applied to products. Specifically, when the Shore hardness exceeds 12, a yellowing phenomenon may occur due to external impact or stress generated by the processes, and in the case of Reference Examples 1 and 3, it can be confirmed that extremely high Shore hardnesses are exhibited. Furthermore, when the Shore hardness is less than 9, the adhesion performance extremely deteriorates, so that there is a problem in that performance required when the adhesive composition for optical use is applied to a product is not implemented, and in the case of Reference Example 2, it can be confirmed that the Shore hardness is extremely low. In contrast, the Examples have suitable Shore hardnesses and shear strengths, and thus may implement excellent performance when the adhesive compositions for optical use are applied to a product.

Further, referring to the result of Reference Example 3, it can be confirmed that the weight ratio of the monofunctional polyester-based urethane acrylate oligomer and the bifunctional polyester-based urethane acrylate oligomer is within 4:1 to 7:1, but there is a problem in that the hardness is extremely increased by using the bifunctional polyester-based urethane acrylate oligomer having a weight average molecular weight of less than 30,000.

The invention claimed is:

1. An adhesive composition for optical use, comprising:
   a polyester-based urethane acrylate oligomer;
   an acrylate-based monomer;
   a photoinitiator; and
   a Anti-hydrolysis agent,
   wherein the polyester-based urethane acrylate oligomer comprises a mixture of a monofunctional polyester-based urethane acrylate oligomer having a weight average molecular weight (Mw) of 10,000 or more and 25,000 or less and a polyfunctional polyester-based urethane acrylate oligomer having a weight average molecular weight (Mw) of 30,000 or more and 40,000 or less, and
   wherein a weight ratio of the monofunctional polyester-based urethane acrylate oligomer to the polyfunctional polyester-based urethane acrylate oligomer is 4:1 to 7:1.

2. The adhesive composition of claim 1, wherein the Anti-hydrolysis agent has a melting point (Tm) of 0° C. or more and 40° C. or less.

3. The adhesive composition of claim 1, wherein the Anti-hydrolysis agent is a liquid.

4. The adhesive composition of claim 1, wherein the Anti-hydrolysis agent comprises a carbodiimide-based compound, an isocyanate-based compound, a polyfunctional hydroxy group-containing compound, a polyfunctional carboxyl group-containing compound, a polyfunctional amine-based compound, or a combination thereof.

5. The adhesive composition of claim 1, wherein the acrylate-based monomer comprises: a monomer having a cycloalkyl group having 3 to 15 carbon atoms; a monomer having a heterocycloalkyl group having 2 to 15 carbon atoms; or a monomer having a hydrophilic functional group.

6. The adhesive composition of claim 1, wherein a content of the Anti-hydrolysis agent is 0.1 parts by weight or more and 10 parts by weight or less based on 100 parts by weight of the polyester-based urethane acrylate oligomer.

7. The adhesive composition of claim 1, wherein a content of the acrylate-based monomer is 10 parts by weight or more and 25 parts by weight or less based on 100 parts by weight of the polyester-based urethane acrylate oligomer.

8. The adhesive composition of claim 1, further comprising:
   one selected from a group consisting of a thixotropic agent, a plasticizer, an antioxidant, a light stabilizer, a curing agent, a curing accelerator, a tackifier, a surface lubricant, a leveling agent, a softener, an anti-aging agent, an ultraviolet absorber, a polymerization inhibitor, and a combination thereof.

9. An optical device equipped with an adhesive layer comprising photocured products of the adhesive composition for optical use according to claim 1.

10. The optical device of claim 9, wherein the adhesive layer has a Shore hardness of 9 or more and 12 or less.

11. The optical device of claim 8, wherein the adhesive layer has a light transmittance of 90% or more and a haze of 1.0% or less.

* * * * *